(12) United States Patent
Mori et al.

(10) Patent No.: US 8,159,173 B2
(45) Date of Patent: Apr. 17, 2012

(54) CONTROL DEVICE FOR CONTROLLING TRAVEL MOTOR OF VEHICLE

(75) Inventors: Shigenori Mori, Handa (JP); Eiichiro Kawakami, Chiryu (JP)

(73) Assignee: Denso Corporation, Kariya (JP)

( * ) Notice: Subject to any disclaimer, the term of this patent is extended or adjusted under 35 U.S.C. 154(b) by 123 days.

(21) Appl. No.: 12/852,292

(22) Filed: Aug. 6, 2010

(65) Prior Publication Data

US 2011/0031913 A1 Feb. 10, 2011

(30) Foreign Application Priority Data

Aug. 6, 2009 (JP) ................................. 2009-183613

(51) Int. Cl.
*G05B 1/06* (2006.01)

(52) U.S. Cl. ........ 318/605; 318/608; 318/661; 318/654; 318/604; 324/160; 324/163; 324/166; 324/162; 324/207.25; 361/236; 361/239; 361/242; 361/244; 341/112; 341/111; 341/116; 702/151; 702/127

(58) Field of Classification Search ................... 318/605, 318/604, 600, 608, 661, 654, 257; 324/160, 324/163, 166, 167, 171, 162, 207.25; 341/112, 341/111, 116; 361/236, 239, 241, 244; 702/151, 702/127
See application file for complete search history.

(56) References Cited

U.S. PATENT DOCUMENTS

| | | | |
|---|---|---|---|
| 5,162,798 A * | 11/1992 | Yundt | 341/116 |
| 5,896,283 A | 4/1999 | Usami | |
| 6,278,388 B1 | 8/2001 | Kushihara | |
| 6,373,219 B1 * | 4/2002 | Obara et al. | 318/801 |
| 6,834,244 B2 * | 12/2004 | Kim | 702/72 |
| 7,123,175 B2 * | 10/2006 | Katakura et al. | 341/112 |
| 7,578,185 B2 * | 8/2009 | Ether et al. | 73/488 |
| 2009/0160687 A1 | 6/2009 | Nakazato et al. | |
| 2009/0295375 A1 | 12/2009 | Oohira | |

FOREIGN PATENT DOCUMENTS

| | | |
|---|---|---|
| JP | 2000-046584 | 2/2000 |
| JP | 3365063 | 11/2002 |
| JP | 3442316 | 6/2003 |
| JP | 10-215504 | 8/2008 |
| JP | 2008-185406 | 8/2008 |
| JP | 2009-150826 | 7/2009 |

* cited by examiner

*Primary Examiner* — Rita Leykin
(74) *Attorney, Agent, or Firm* — Nixon & Vanderhye PC

(57) ABSTRACT

A control device for a travel motor mounted to a vehicle has a resolver which works as a rotation-angle sensor. The control device has a RDC which calculates a rotation-angle output value $\phi$ based on rotation detection signals Sa, Sb transferred from the resolver. The control device supplies electric power to the travel motor based on the rotation angle output value $\phi$. The RDC calculates "$\sin(\theta-\phi)$" as an error deviation $\epsilon$ based on the signals Sa and Sb and the rotation-angle output value $\phi$. The RDC calculates an angular acceleration by multiplying the error deviation $\epsilon$ with a gain (=Ka·Kb), and integrates the angular acceleration two times in order to obtain a next rotation-angle output value. A gain control part of the RDC decreases the gain when the judgment means judges that the travel motor rotates at a constant rotation speed.

12 Claims, 8 Drawing Sheets

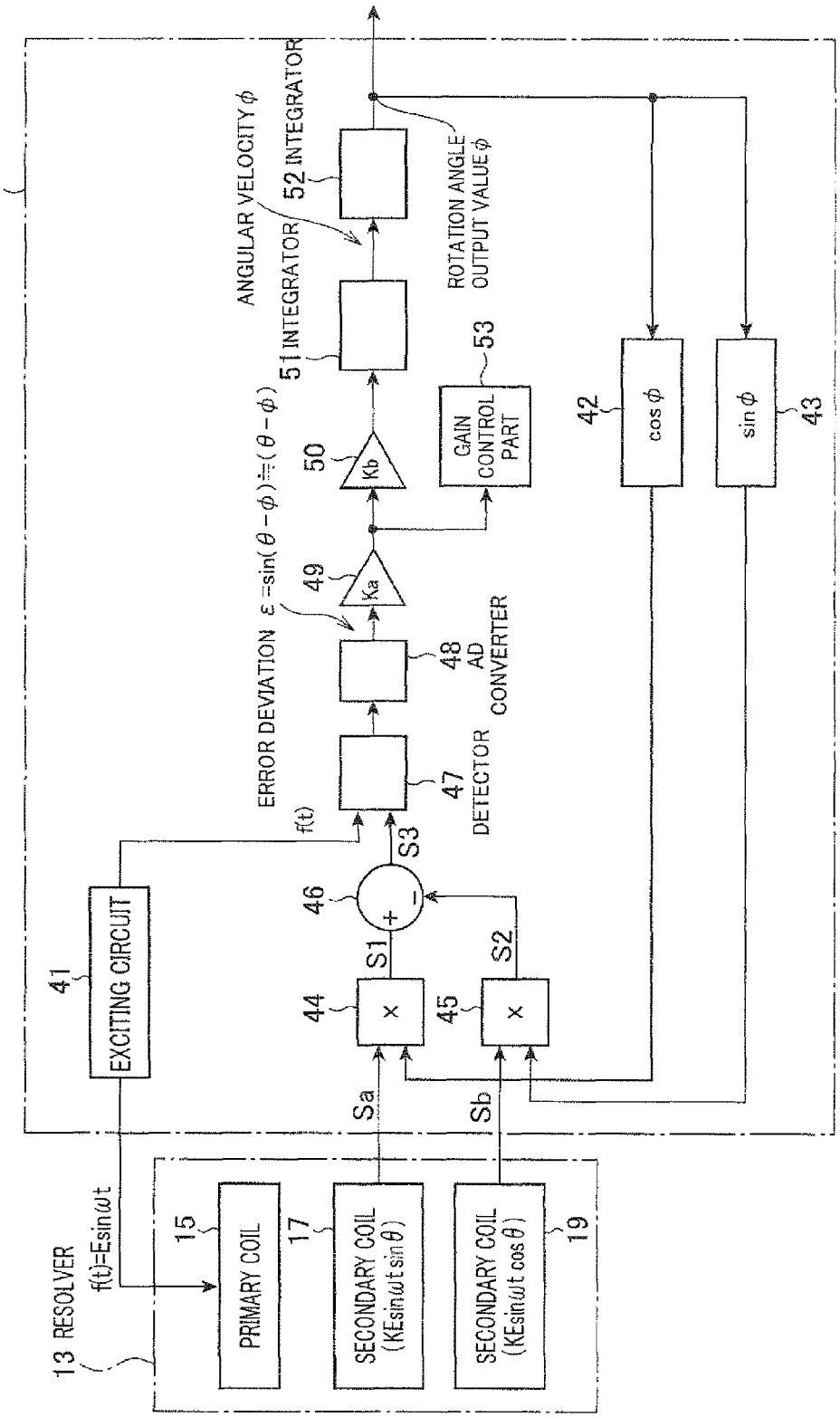

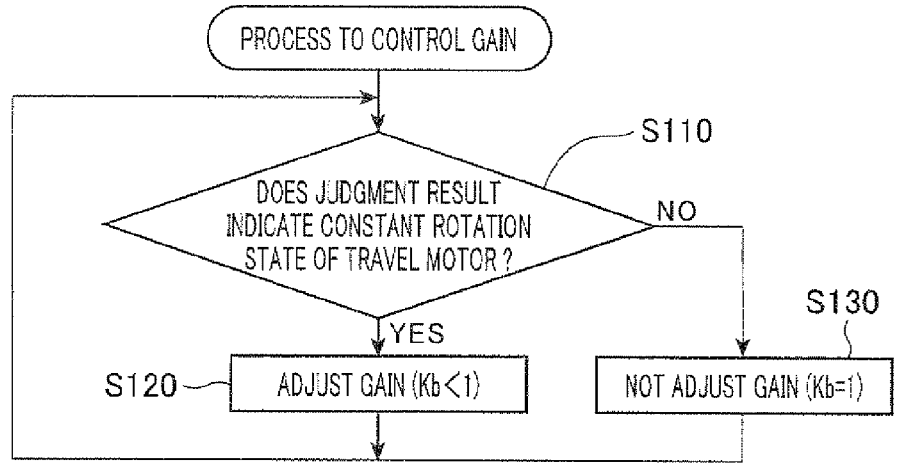
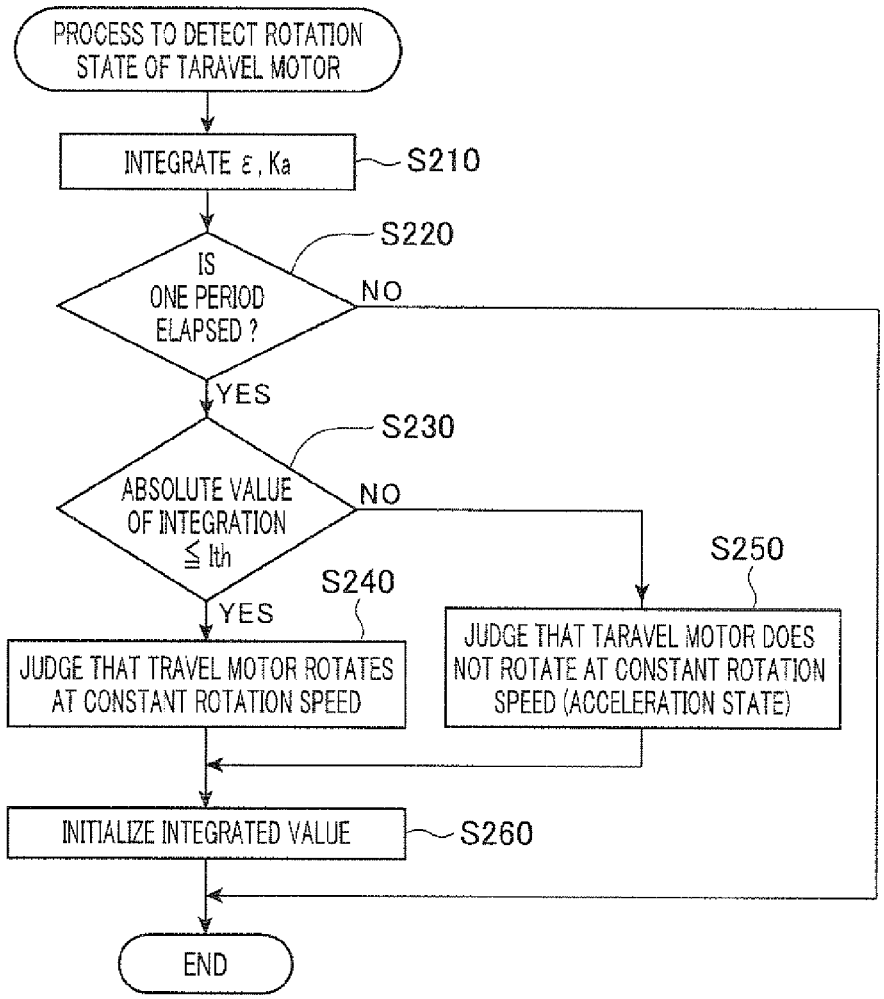

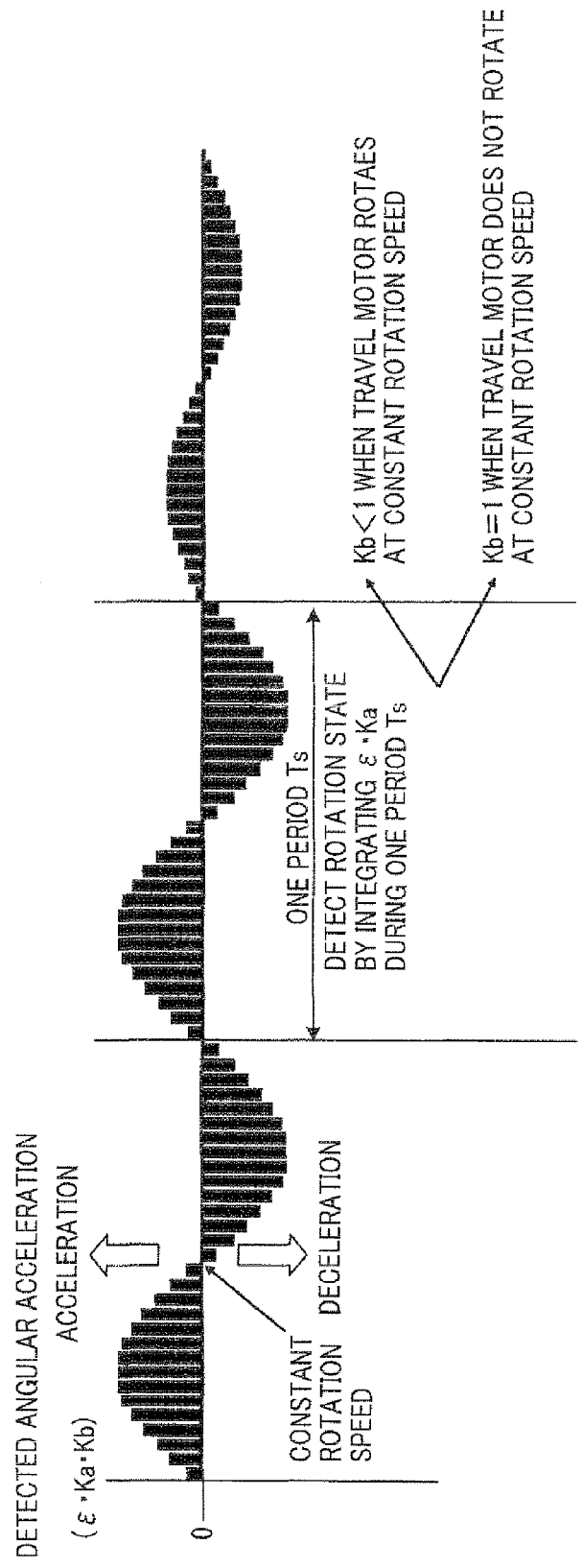

CONTROL DEVICE FOR CONTROLLING TRAVEL MOTOR OF VEHICLE

CROSS-REFERENCE TO RELATED APPLICATION

This application is related to and claims priority from Japanese Patent Application No. 2009-183613 filed on Aug. 6, 2009, the contents of which are hereby incorporated by reference.

BACKGROUND OF THE INVENTION

1. Field of the invention

The present invention relates to a control device for controlling the operation of a travel motor which is mounted to a vehicle.

2. Description of the Related Art

For example, vehicles such as electric motor vehicles and hybrid vehicles are equipped with a travel motor and a control device to control the operation of the travel motor. The travel motor works as a travel power source for the vehicle. The control device controls a current vector of a current which is supplied to the travel motor based on the rotation angle of the rotor of the travel motor. For example, Japanese patent laid open publication No. H10-215504 discloses such a conventional technique to control the current vector of the current which is supplied to the travel motor.

It is therefore possible for the control device capable of controlling the operation of the travel motor to detect the rotation angle of the travel motor with high accuracy. In general, a rotation angle sensor is used to detect the rotation angle of the rotor of a travel motor. For example, a resolver is used as the rotation angle sensor, and there is a resolver digital converter (RDC) of a tracking type which is a well known device to convert an analogue signal output from the resolver to a digital signal. Japanese patent No. JP 3442316 has disclosed such a resolver digital converter.

In general, the resolver is comprised of a primary coil and secondary coils. The resolver outputs a rotation detection signal when receiving an exciting signal F(t) having a constant frequency by the primary coil. In more detail, when the exciting signal F(t) is supplied to the primary coil of the resolver, the secondary coils output a first rotation detection signal "F(t)·sin θ" and a second rotation detection signal "F(t)·cos θ", where the first rotation detection signal "F(t)·sin θ" is obtained by performing the amplitude modulation of the exciting signal F(t) with sin θ, and the second rotation detection signal "F(t)·cos θ" is obtained by performing the amplitude modulation of the exciting signal F(t) with cos θ.

The variable θ is called to as the "resolver electrical angle θ or electrical angle θ" which is obtained by multiplying a mechanical angle as the rotation angle of a motor "n" times, where "n" is an integer of not less than 1. The value "n" is the number of rotations of the electrical angle θ per one rotation of the motor (that is, a multiple rate of the electrical angle θ to the mechanical angle). The value "n" is in general called to as a "shaft multiple angle".

The RDC (resolver digital converter) outputs the rotation angle output value φ in digital form as the detection value of the electrical angle θ. The RDC performs a tracking loop calculation to feed back the rotation angle output value φ as the input of the RDC every constant time period.

In the tracking loop calculation, the RDC outputs a next rotation angle output value φ in order to satisfy the relationship of φ=θ by the following steps (a-1), (a-2), (a-3), and (a-4):

(a-1) obtaining the first output signal F(t)·sin(θ−φ)=[F(t)·sin θ·cos φ]−[F(t)·cos θ·sin φ] by multiplying the first rotation detection signal F(t)·sin θ and the second rotation detection signal F(t)·cos θ transferred from the resolver and sin φ and cos φ which are obtained based on the output current angle value φ of the RDC;

(a-2) obtaining the second output signal of sin(θ−φ) as an error deviation ε by performing the synchronous detection of the first output signal F(t)·sin(θ−φ) and removing the component of the exciting signal F(t) from the value after the synchronous detection;

(a-3) integrating the value obtained by multiplying the error deviation ε by a predetermined gain; and (a-4) further integrating the integrated value obtained by (a-3) in order to obtain the next rotation angle output value φ.

Japanese patent publication No. JP 3442316 does not show the process to multiply the error deviation ε by a gain. However, in order to optimize the tracking loop process by using the error deviation ε of a small value, it is necessary to multiply the error deviation ε by a constant gain value.

The control device for a travel motor detects the rotation angle of the travel motor based on the rotation angle output value φ from the RDC, and determines a current vector of the current to be supplied to the travel motor based on the obtained rotation angle of the travel motor.

By the way, the RDC can perform an ideal operation and detect the rotation angle with high accuracy when the rotation detection signals in two phase transferred from the resolver have the same amplitude and there is no offset in those rotation detection signals.

Japanese patent publication No. JP 3365063 discloses the technique to correct the amplitude and offset of a rotation detection signal transferred from a resolver.

In the conventional technique disclosed in Japanese patent publication No. JP 3365063, the rotation angle of a rotary body is detected based on sine-wave signals in A phase and B phase which are different by 90° and output from a sine-wave encoder. This conventional technique performs the following operations every output period of the sine-wave encoder:

(b-1) the maximum value and the minimum value of the sine-wave signals in A phase and B phase are obtained;

(b-2) an amplitude change ratio is calculated based on a ratio between the amplitude of each of the sine-wave signals in A phase and B phase obtained based on the maximum value and the minimum value and a reference amplitude; and (b-3) the signal values in A phase and B phase are corrected based on the amplitude change ratio calculated by using the maximum value and the minimum value, where those calculated signal values in A phase and B phase are used to detect the rotation angle of the rotary body such as a travel motor.

In addition, the conventional technique disclosed in Japanese patent publication No. JP 3365063 calculates the offset value of each of the signal values in A phase and B phase by dividing a difference between the maximum value and the minimum value by 2, and corrects offset values in A phase and B phase by subtracting the signal values in A phase and B phase to be used to detect the rotation angle of the rotary body from the previous offset value based on the maximum value and the minimum value previously obtained one period before.

Applying the conventional technique disclosed in JP 3365063 to the RDC allows the amplitude and offset of each of a sin θ component and a cos θ component of the rotation detection signals transferred from the resolver to be corrected.

However, the resolver has another problem to have a manufacturing error in shape of the rotor and the stator thereof.

There is a possibility for the resolver not to output rotation detection signals of a complete sin θ waveform and a complete cos θ waveform based on the fluctuation in phase of the rotor and the stator. This will be referred to as the "output waveform distortion of a resolver".

When the resolver outputs the rotation detection signals having a waveform distortion, the RDC does not generate a correct output, and this increases an error component in the rotation angle output value φ output from the RDC (in other words, the detection accuracy of the RDC to detect the rotation angle of the travel motor is decreased), and this decreases the control accuracy of the rotary body such as the travel motor. The conventional technique disclosed in JP 3365063 does not suppress the deterioration of the rotation detection accuracy caused by the distortion of the output waveform of the resolver.

FIG. 9 is an explanatory view showing a problem caused by a conventional technique when a resolver outputs a detection signal with a waveform distortion.

For example, as designated by the solid line in FIG. 9, the resolver outputs the rotation detection signal having a distortion of an output waveform, the RDC outputs a non-linear rotation angle value φ which is not changed in proportion to the elapse of time even when the travel motor is rotates at a constant speed. Because the control device for a travel motor obtains the rotation angle of the drive motor based on the rotation angle output value φ transferred from the RDC and determined the current vector to be supplied to the travel motor, it would be difficult for the control device to output the optimum current vector. This decreases the accuracy to control the rotation angle of the travel motor. In particular, the long and dash line in FIG. 9 shows the ideal rotary angle detection value φ when the travel motor rotates at a constant speed.

Further specifically, when the control device for a travel motor instructs the travel motor to rotate at a constant rotation speed in order to drive the vehicle at a constant speed according to the information instructed by the driver of the vehicle such as by the stroke of the accelerator pedal, the control device controls the travel motor to operate based on a different rotation angle which is different from an actual rotation angle of the travel motor by the rotation angle detection error caused by an output waveform distortion from the resolver. This increases or decreases the output torque of the travel motor, and thereby causes undesired acceleration or deceleration of the vehicle. This gives uncomfortable driving to the passengers and the driver of the vehicle. Through the specification, the word "acceleration" includes both a positive acceleration and a negative acceleration (that is, deceleration) unless otherwise indicated.

SUMMARY OF THE INVENTION

It is an object of the present invention to provide a control device for a travel motor of a vehicle capable of keeping an optimum performance to control the operation of the travel motor by suppressing deterioration in accuracy to control the rotation angle of the travel motor even if a resolver outputs a detection signal with a waveform distortion.

To achieve the above purposes, the present invention provides a control device for a travel motor mounted to a vehicle. In general, such a vehicle is equipped with a travel motor and a resolver. The travel motor works as a power source to supply electric power to the vehicle. The resolver works as a rotation angle sensor to detect a rotation angle of the rotor of the travel motor, and to generate and output rotation detection signals. On receiving an exciting signal, the resolver generates and outputs rotation detection signals which correspond to a rotation angle of the rotor of the travel motor. The rotation detection signals are composed of a first rotation detection signal and a second rotation detection signal. The first rotation detection signal has a waveform obtained by amplitude modulation of the exciting signal by sin θ which is an angle obtained by multiplying the rotation angle of the travel motor by a several integer "n" times of not less than 1. The second rotation detection signal has a waveform obtained by amplitude modulation of the exciting signal by cos θ. The component "θ" is called to as the "electrical angle", and "n" is called to as the "shaft multiple angle".

The control device according to the present invention has a resolver digital converter (RDC) of a tracking type which is capable of receiving the first rotation detection signal Sa and the second rotation detection signal Sb transferred from the resolver. The RDC calculates and outputs the rotation angle output value φ as the detection value of the electric angle θ based on the first and second rotation detection signals. In particular, the RDC calculates a value of sin(θ−φ) as an error deviation ε (or a control deviation) based on the first rotation detection signal, the second rotation detection signal, and a current rotation angle output value every a constant time period, and integrates a value obtained by multiplying the error deviation ε by a gain in order to calculate and output a next rotation angle output value φ. This gain is a predetermined value.

The control device for a travel motor according to the present invention is capable of controlling a power supply to the travel motor based on the rotation angle output value φ which is output from the RDC.

As well known, the control device according to the present invention detects the rotation angle of the travel motor based on the rotation angle output value φ output from the RDC. At this time, it is possible to obtain the rotation angle (mechanical angle) of the travel motor by dividing the rotation angle output value φ by the shaft multiple angle "n". The control device for a travel motor changes a current vector of a current supplied to the travel motor according to the detected rotation angle.

In particular, the RDC in the control device has a gain judgment means and a gain adjustment means. The gain judgment means judges whether or not the travel motor rotates at a constant rotation speed based on the above error deviation ε. The gain adjustment means decreases the gain when the judgment result of the judgment means indicates that the travel motor rotates at a constant rotation speed.

That is, because the RDC integrates two times the value obtained by multiplying the error deviation ε by the gain in order to obtain the rotation angle output value φ, it can be said that the value "ε×gain" corresponds to the detection value of the acceleration of the electrical angle θ (that is, the angular acceleration). In the control device according to the present invention, the gain adjustment means in the RDC decreases the gain of the error deviation ε in order for the detection value of the angular acceleration to approach zero when detecting that the travel motor rotates at a constant rotation speed based on the error deviation ε. This control process makes it possible to change the rotation angle output value φ to the time elapse as proportional as possible.

Accordingly, when the ECU as the control device intends to drive the travel motor at a constant rotation speed, even if the resolver outputs a detection signal containing a waveform distortion, it is possible to suppress the decrease of accuracy to detect the rotation angle of the travel motor, and to keep the superior performance to control the operation of the travel motor, and to give a comfortable driving to the passengers and driver of the vehicle.

Further, the control device according to the present invention does not decrease the gain of the error deviation ε unless the judgment means judges that the travel motor rotates at a constant rotation speed. Accordingly, because the rotation angle output value φ output from the RDC can be changed accurately corresponding to and quickly responding to the acceleration of the travel motor when the control device instructs the travel motor to accelerate, it is possible for the control device according to the present invention to drive the rotation speed of the travel motor with good response.

In general, when the control device instructs the travel motor to accelerate, the actual acceleration of the travel motor becomes larger than undesirable acceleration caused by a rotation angle detection error. Therefore there is no problem for the passengers and driver of the vehicle to feel uncomfortable driving.

BRIEF DESCRIPTION OF THE DRAWINGS

A preferred, non-limiting embodiment of the present invention will be described by way of example with reference to the accompanying drawings, in which:

FIG. 2 is a view showing a circuit configuration of the resolver and the RDC according to the first embodiment shown in FIG. 1;

FIG. 3 is a flow chart showing a process to control a gain performed by the gain control part in the RDC of the ECU according to the first embodiment of the present invention;

FIG. 4 is a flow chart showing a process to detect a rotation state of the travel motor performed by the gain control part in the RDC of the ECU according to the first embodiment of the present invention;

FIG. 5 is an explanatory view showing the effect of the ECU having the RDC of the ECU according to the first embodiment of the present invention;

DETAILED DESCRIPTION OF THE PREFERRED EMBODIMENTS

Figure 1:
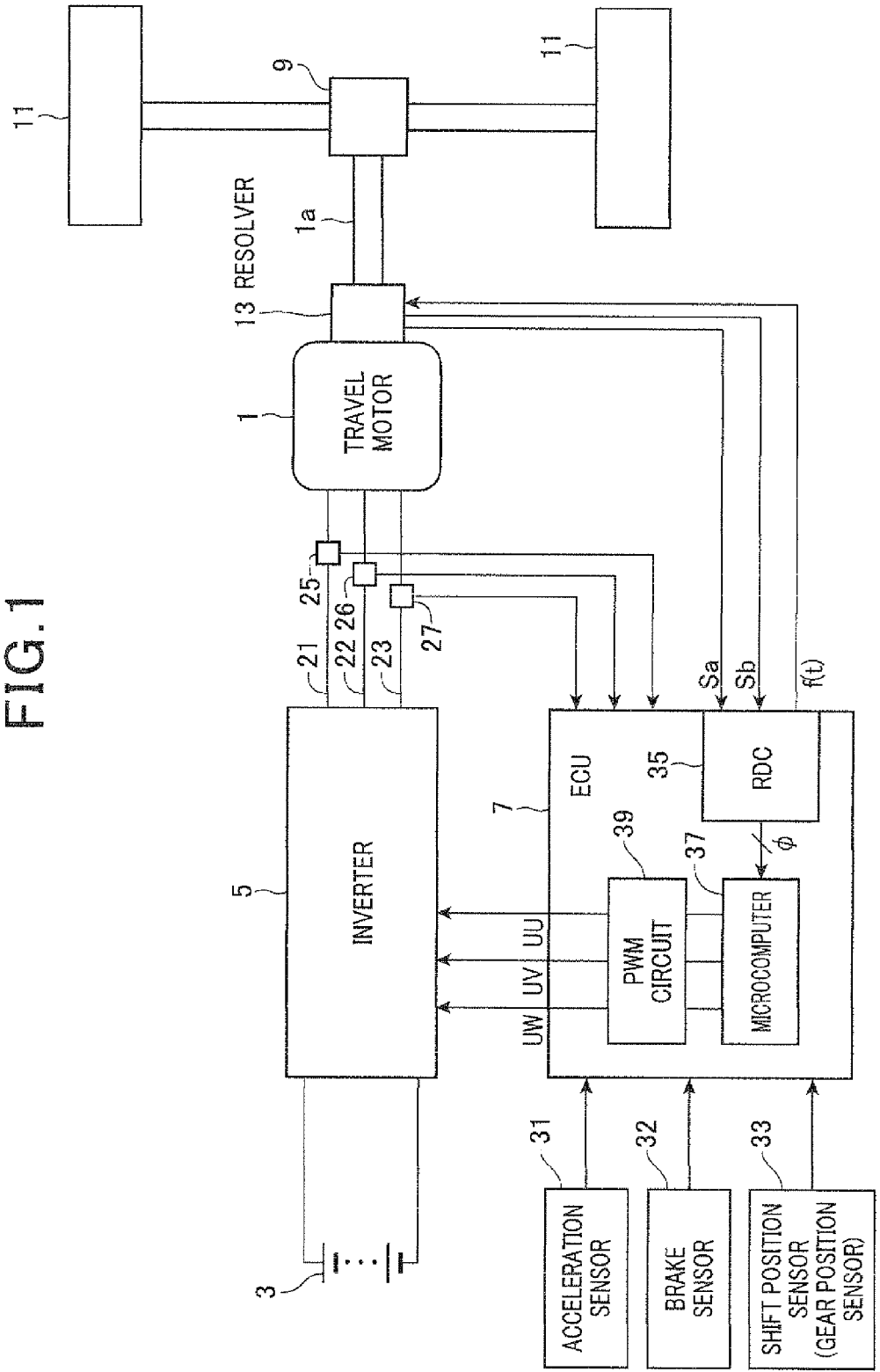
FIG. 1 is a view showing a circuit configuration of a control system of an electric vehicle comprised of a travel motor, an inverter, an ECU (control device) having a resolver digital converter (RDC) according to the embodiments of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the control device capable of controlling the operation of a travel motor mounted to an electric vehicle according to the first embodiment of the present invention with reference to FIG. 1 to FIG. 5.

FIG. 1 is a view showing a circuit configuration of the control system for an electric vehicle comprised of a resolver 13, an inverter 5, a travel motor 1, and an ECU (control device) 7 having an RDC 35 according to the embodiments of the present invention.

As shown in FIG. 1, the electric vehicle is equipped with the travel motor 1 composed of an AC synchronous motor which is known and available in the commercial markets, a battery 3 which serves as a DC power source, the inverter 5 which is also known device and drives the travel motor 1, and the ECU 7 (control device) which is comprised of a resolver digital converter 35, a microcomputer 37, and a PWM circuit 39. The RDC 35 is capable of controlling the operation of the travel motor 1. An output shaft 1a of the travel motor 1 is engaged with drive wheels 11 which are placed at right and left sides of the electric vehicle through a differential gear 9.

The inverter 5 is composed of six switching elements (not shown), each of which is an IGBT (Insulated gate bipolar transistor), and a drive circuit capable of driving those switching elements. On receiving pulse modulated signals HU, UV, and UW transferred from the ECU 7, the drive circuit instructs the switching elements to turn on and off in order to convert the direct current supplied from the battery 3 to a three phase AC current.

The resolver 13 is placed on the output shaft 1a of the travel motor 1 in order to detect a rotation angle of the output shaft 1a of the rotor of the travel motor 1.

The resolver 13 is comprised of a stator and a rotor. The rotor of the resolver 13 is freely engaged with the stator in order to freely rotate, and fixed to the output shaft 1a of the stator. Hereinafter, the stator and the rotor of the resolver 13 will also be referred to as the "resolver stator and the resolver rotor", respectively.

The resolver 13 is formed so that a reluctance between the resolver stator and the resolver rotor is changed according to the rotation position (which corresponds to the rotation angle of the motor 1) of the resolver rotor.

The resolver 13 outputs two rotation detection signals which are shifted to each other in phase by electrical angle of 90° and the amplitude of which is changed in sine waveform according to the change of the reluctance.

FIG. 2 is a view showing a circuit configuration of the resolver 13 and the RDC 35 in the ECU 7 according to the first embodiment of the present invention shown in FIG. 1. As shown in FIG. 2, the resolver stator is comprised of a primary coil 15, and two secondary coils 17 and 19.

When the primary coil 15 in the resolver 13 receives an exciting signal f(t) of a sine waveform having a constant frequency transferred from the RDC 35, the secondary coils 17 and 19 output the first rotation detection signal Sa and the second rotation detection signal Sb according to the rotation angle of the travel motor 1, respectively.

$f(t) = E \cdot \sin \omega t,$ $Sa = K \cdot f(t) \cdot \sin \theta = K \cdot E \cdot \sin \omega t \cdot \sin \theta,$ and $Sb = K \cdot f(t) \cdot \cos \theta = K \cdot E \cdot \sin \omega t \cdot \cos \theta,$ where E is an amplitude of the exciting signal f(t) transferred from the RDC 35, K is a transformation ratio between the primary coil 15 and the secondary coils 17 and 19, θ is an angle obtained by multiplying the rotation angle (mechanical angle) of the travel motor 1 by n (where n is a shaft angle multiple, which is an integer not less than 1), that is, "θ" is an electrical angle of the resolver 13.

That is, in the control system having the ECU 7 according to the first embodiment, the resolver 13 is formed so that one period of the rotation detection signals Sa and Sb (as one period of sin θ and cos θ as the basic waveform components) of the change of the reluctance between the resolver rotor and the resolver stator corresponds to one rotation of the resolver rotor (one rotation of the travel motor 1).

The present invention is not limited by the configuration of the resolver 13. For example, it is sufficient for the resolver 13 to have the shaft angle multiple of not less than 2.

In the control system shown in FIG. 1, current sensors 25, 26, and 27 are placed to the current supply lines 21, 22, and 23 between the inverter 5 and the travel motor 1. The current sensor 25 detects the U phase current of the travel motor 1 and outputs the U phase current signal. Similarly, the current sensor 26 detects the V phase current of the travel motor 1 and outputs the V phase current signal. The current sensor 27 detects the W phase current of the travel motor 1 and outputs the W phase current signal. Those U phase, V phase, and W phase current signals are supplied to the ECU 7.

In general, the electric vehicle is equipped with an accelerator pedal sensor 31, a brake pedal sensor 32, and a shift gear position sensor 33 in order to detect the driving state of the electric vehicle.

The accelerator pedal sensor 31 is placed at the accelerator pedal (omitted from the drawings) which is depressed by the driver of the vehicle. The accelerator pedal sensor 31 outputs an accelerator open signal corresponding to the stroke (or operation amount) of the accelerator pedal depressed by the driver of the vehicle.

The brake sensor 32 is attached to the brake pedal (omitted from the drawings) which is depressed by the driver of the vehicle, and outputs a brake oil pressure signal which corresponds to a depressed stroke of the brake pedal.

The shift gear position sensor 33 is placed at the shift lever (gear stick or gear lever, omitted from the drawings) to change the gear ratio in the vehicle by the driver of the vehicle, and detects for the driver to handle and select which gear position (forward gears, neutral position, and reverse gear), and outputs a shifted gear position signal according to the selected gear ratio.

The ECU 7 receives the accelerator open signal, the brake oil pressure signal, and the shift gear position signal transferred from the sensors 31 to 33 as the vehicle operation information.

The ECU 7 is comprised of the RDC (resolver digital converter) 35, the microcomputer 37, and the pulse width modulation circuit (PWM circuit) 39. The microcomputer 37 is composed of a central processing unit (CPU), a read only memory (ROM), a random access memory (RAM), and input and output (I/O) circuit. The RDC 35 of a digital tracking type receives the rotation detection signals Sa and Sb transferred from the resolver 13, and generates and outputs a rotation angle output value φ in digital form which is a detection signal of the electrical angle θ based on the rotation detection signals Sa and Sb. The electrical angle θ corresponds to the rotation angle of the travel motor 1 in the first embodiment).

The PWM circuit 39 generates the pulse width modulation signals UU, UV, and UW which correspond to each of the three phase AC currents according to the control signals transferred from the microcomputer 37. This makes it possible to supply the three phase AC currents in U phase, V phase, and W phase from the inverter 5 to the travel motor 1.

The microcomputer 37 inputs the rotation angle output value φ transferred from the RDC 35 as the detection value of the rotation angle of the travel motor 1. For example, the microcomputer 37 calculates the rotation speed (the number of rotation) of the travel motor 1 based on the change per unit time.

The microcomputer 37 drives the inverter 5 based on the rotation angle and the number of the rotation as the rotation information of the travel motor 1 and the signals transferred from the current sensors 25 to 27 and other sensors 31 to 33. This control allows the travel motor 1 to generate the output torque according to the driving state of the electric vehicle. Such a control of the travel motor 1 is known.

That is, the microcomputer 37 calculates a requested amount of the torque which is output from the travel motor 1 based on the rotation angle and the number of the rotation of the travel motor 1 and the vehicle driving state information (accelerator pedal open signal, the brake oil pressure signal, and the shift gear position signal), and calculates a current instruction vector by a known vector calculation based on the request amount. The microcomputer 37 outputs a control signal to generate the torque of the request amount in the travel motor 1 based on the calculated current instruction vector. At this time, the microcomputer 37 performs the feedback control of the control signal (the PWM circuit 39 to the inverter 5) to be supplied to the PWM circuit 39 based on at least two current signals (for example, U phase current signal and W phase current signal) supplied from the current sensors 25 to 27 so that each of the three phase AC currents becomes its target current value.

Next, a description will now be given of the RDC 35 with reference to FIG. 2.

As shown in FIG. 2, the RDC 35 is equipped with the exciting circuit 41 to generate and output the exciting signal f(t) to the primary coil 15 of the resolver 13. The RDC 35 repeatedly performs the calculation of the tracking loop every time period in order to equal the rotation angle output value φ to the electric angle θ of the resolver 13.

That is, a cos φ generation part 42 in the RDC 35 generates and outputs the signal (hereinafter, referred to as the "cos φ signal" or "cos φ component") having the voltage value of cos φ based on the current rotation angle output value φ. Similarly, a sin φ generation part 43 in the RDC 35 generates and outputs the signal (hereinafter, referred to as the "sin φ signal" or "sin φ component") having the voltage value of sin φ based on the current rotation angle output value φ.

A multiplier 44 in the RDC 35 multiplies the first rotation detection signal Sa transferred from the resolver 13 with the cos φ signal transferred from the cos φ generation part 42, and divides the multiplication result by the transformation ratio K to obtain the following first multiplication signal S1, where, K is the transformation ratio between the primary coil 15 and the secondary coils 17 and 19.

$$S1 = f(t) \cdot \sin\theta \cdot \cos\phi.$$

Similarly, a multiplier 45 in the RDC 35 multiplies the second rotation detection signal Sb transferred from the resolver 13 by the sin φ signal transferred from the sin φ generation part 43, and divides the multiplication result by the transformation ratio K in order to obtain the following second multiplication signal S2.

$$S2 = f(t) \cdot \cos\theta \cdot \sin\phi.$$

A subtracter 46 in the RDC 35 subtracts the second multiplication signal S2 from the first multiplication signal S1 to obtain the following subtraction signal S3.

$$S3 = f(t) \cdot [(\sin\theta \cdot \cos\phi) \cdot (\cos\theta \cdot \sin\phi)]$$
$$= f(t) \cdot \sin(\theta \cdot \phi).$$

Further, a detector 47 in the RDC 35 performs a synchronous detection of the subtraction signal S3 based on the exciting signal f(t) in order to output an error deviation signal (or a difference component signal as a control deviation to be controlled) (=sin(θ−φ)) from which the exciting signal component f(t) is eliminated from the subtraction signal S3.

An A/D converter 48 in the RDC 35 converts the error deviation signal transferred from the detector 47 to a digital error deviation signal (=sin(θ−φ)), and outputs the error deviation ε (=sin(θ−φ)) in digital form. Because the value "sin(θ−φ)" can be approximated to the value "(θ−φ)", it can be said that the error deviation ε is a difference between θ and φ.

The multiplier 49 which serves as an amplifier multiplies the error deviation ε transferred from the A/D converter 48 by a fixed gain Ka, and the multiplier 50 which serves as an amplifier further multiplies the error deviation ε, which is output from the multiplier 49, by a variable gain Kb. This gain Kb used in the multiplier 50 is a variable within a range of not more than 1 and more than 0, which is determined by a gain control part 53 in the RDC 35.

An integrator 51 in the RDC 35 integrates the output (=ε·Ka·Kb) transferred from the multiplier 50, where the integrator 51 is equipped with a known compensating filter. An integrator 52 then integrates the output (integration result) transferred from the integrator 51. The RDC 35 outputs the integration result of the integrator 52 as a next rotation angle output value φ.

In the RDC 35 having the above configuration, the total gain (Ka·Kb) obtained by the two multipliers 49 and 50 is the gain to obtain the angular acceleration (acceleration of the electrical angle θ) based on the error deviation ε. When the circuit parts 42, 43, and 48 to 52 (that is, the cos φ generation part 42, the sin φ generation part 43, and the A/D converter 48, the multiplier 49, the multiplier 50, the integrator 51, and the integrator 52) operate every constant time period in synchronization with an operation clock signal to perform the tracking loop calculation to make and output a next rotation angle output value φ.

Such a constant time period is set to a time period which is extremely shorted than an ideal minimum time period which is required for the travel motor 1 to rotate per revolution.

Further, the parts in the RDC 35 other than the multiplier 50 and the gain control part 53 shown in FIG. 2 are known part in a conventional RDC. Accordingly, the gain Ka obtained in the multiplier 49 is set to a positive value to output a correct rotation angle output value φ when the RDC 35 theoretically operates when the resolver 13 can output the rotation detection signals Sa and Sb having an ideal waveform without any distortion, and the multiplier 50 has the gain Kb of 1 (that is, the output of the multiplier 49 is supplied to the multiplier 50 without distortion).

A description will now be given of the gain control part 53 and the gain control process performed by the gain control part 53 in the RDC 35 as the important feature of the present invention with reference to FIG. 3.

FIG. 3 is a flow chart showing the process to control the gain performed by the gain control part 53 in the RDC 35 of the ECU 7 according to the first embodiment of the present invention;

In the flow chart shown in FIG. 3, the gain control part 53 performs the process to detect the rotation state of the travel motor 1 in order to detect whether or not the travel motor 1 is in a constant rotation state (that is, the travel motor 1 rotates at a constant rotation speed) based on the output signal (=ε·Ka) transferred from the multiplier 49. Because the output signal from the multiplier 49 is the value obtained by multiplying the error deviation ε and a fixed gain Ka together, the gain control part 53 detects in practice the rotation state of the travel motor 1 based on the error deviation ε.

The gain control part 53 performs the gain control process every updating of the detection result of the rotation state detection process.

As shown in FIG. 3, the gain control process sets a value of less than 1 to the gain Kb (step S120). This gain Kb is used in the multiplier 50 when the detection result of the rotation state detection process indicates the travel motor 1 rotates at a constant rotation speed ("YES" in step S110).

On the other hand, the gain control process sets a value of 1 to the gain Kb (step S130) used in the multiplier 50 when the detection result of the rotation state detection process indicates the travel motor 1 does not rotate at a constant rotation speed ("NO" in step S110).

The gain control part 53 decreases the total gain (=Ka·Kb) in the multipliers 49 and 50 so that the total gain becomes smaller than the gain Ka (step S120) when detecting that the travel motor 1 rotates at a constant rotation speed ("YES" in step S110).

On the other hand, the gain control part 53 instantly sets the total gain (=Ka·Kb) in the two multipliers 49 and 50 so that the total gain becomes equal to the value Ka (step S130) when the travel motor 1 does not rotate at a constant rotation speed ("NO" in step S110).

A description will now be given of the process to detect the rotation state of the travel motor 1 performed by the gain control part 53 with reference to FIG. 4.

FIG. 4 is a flow chart showing the process to detect the rotation state of the travel motor 1 performed by the gain control part 53 in the RDC 35 of the ECU 7 according to the first embodiment of the present invention.

The gain control part 53 performs the process to detect the rotation state of the travel motor 1 shown in FIG. 4 every updating the output of the multiplier 49, in other words, every calculating the error deviation ε by the gain control part 53.

As shown in FIG. 4, the gain control part 53 integrates the output (ε·Ka) of the multiplier 49 (step S210).

This integration process is the process to accumulate the output of the multiplier 49. When the relationship of θ>φ is satisfied, the error deviation ε and the value of [ε·Ka] takes a positive value, and on the other hand, when θ<φ is satisfied, the error deviation ε and the value of [ε·Ka] take a negative value. Therefore the above integration process accumulates the output of the multiplier 49 with a positive/negative sign.

The gain control part 53 further detects whether or not the time of not less than N times of one period Ta (one rotation period of the electrical angle θ) of the sin θ component in the first rotation detection signal Sa has been elapsed (step S220).

The RDC 35 in the ECU 7 according to the first embodiment uses N=1 and the gain control part 53 detects whether or not the time of one period Ta (one rotation period of the electrical angle θ) of the sin θ component in the first rotation detection signal Sa has elapsed. The present invention is not limited by N=1. For example, it is also acceptable to use N of not less than 2.

It is possible to detect whether or not the one period Ts has elapsed based on whether or not the rotation angle output value $\phi$ of the RDC 35 reaches the value corresponding to the one rotation (360°) of the electrical angle $\theta$.

On the other hand, it is acceptable to detect whether or not one period TS has elapsed based on the information, transferred from the microcomputer 37, regarding the time length of one period Ts and the elapse of the one period Ts.

As shown in FIG. 4, when the one period Ts has not elapsed ("NO" in step S220), the gain control part 53 completes the rotation state detection process.

After the time elapse of one period Ts ("YES" in step S220), the gain control part 53 detects whether or not the absolute value of the integration of the output value $\epsilon \cdot Ka$ of the multiplier 49 at this time is not more than a predetermined threshold value Ith (step S230). When the detection result in step S230 indicates that the absolute value of integration of the output value $\epsilon \cdot Ka$ is not more than the predetermined threshold value Ith ("YES" in step S230), the gain control part 53 judges that the travel motor 1 rotates at a constant rotation speed, and sets the judgment result to a flag in a memory (not shown), which indicates that the travel motor 1 rotates at a constant rotation speed (step S240). The gain control part 53 initializes the integration value to zero (step S260), and completes the process to detect the rotation state of the travel motor 1 shown in FIG. 4.

On the other hand, when the absolute value of integration of the output value $\epsilon \cdot Ka$ of the multiplier 49 is more than the predetermined threshold value Ith ("NO" in step S230), the gain control part 53 judges that the travel motor 1 does not rotate at a constant rotation speed and the travel motor 1 is in acceleration or deceleration state, and sets the judgment result to the flag in the memory (not shown), which indicates the acceleration rotation speed (step S250). The gain control part 53 then initializes the integration value to zero (step S260), and completes the process to detect the rotation state of the travel motor 1 shown in FIG. 4.

That is, the process to detect the rotation state of the travel motor 1 shown in FIG. 4 integrates the output value (=$\epsilon \cdot Ka$) of the multiplier 49 per period Ts of one rotation of the electrical angle $\theta$, and detects whether or not the travel motor 1 rotates at a constant rotation speed based on the judgment result whether or not the absolute value of the integration value is the predetermined threshold value Ith.

As described above, when detecting that the travel motor 1 rotates at a constant rotation speed, the RDC 35 in the ECU 7 according to the first embodiment of the present invention decreases the total gain (=$Ka \cdot Kb$) which is used to obtain the angular acceleration based on the error deviation $\epsilon$. This allows the detection value (=$\epsilon \cdot Ka \cdot Kb$) of the angular acceleration which is supplied to the multiplier 50 from the multiplier 51 to approach the value of zero, and thereby the rotation angle output value $\phi$ to be changed in proportion to the time.

FIG. 5 is an explanatory view showing the effect of the ECU 7 having the RDC 35 according to the first embodiment of the present invention.

In FIG. 5, the horizontal line indicates the time elapse, and the vertical line indicates the detected angular acceleration $\epsilon \cdot Ka \cdot Kb$ which is transferred from the multiplier 49 to the integration 51 in the RDC 35.

It can be said that the travel motor 1 rotates at a constant rotation speed when the detected angular acceleration $\epsilon \cdot Ka \cdot Kb$ is zero, the travel motor 1 rotates at a positive acceleration speed when a positive value, and the travel motor 1 rotates at a negative acceleration speed when the detected angular acceleration $\epsilon \cdot Ka \cdot Kb$ takes a negative value.

By the way, when the resolver 13 outputs the first rotation detection signal Sa and the second rotation detection signal Sb which have a waveform distortion, the detected angular acceleration does not become zero, and is changed around zero even if the travel motor 1 rotates at a constant rotation speed.

In the control device according to the first embodiment, the value "$\epsilon \cdot Ka$" which changes like the detected angular acceleration $\epsilon \cdot Ka \cdot Kb$ is integrated every period Ts during the rotation of the electric angle $\theta$, and it is judged that the travel motor 1 rotates at a constant rotation speed and the total gain (=$Ka \cdot Kb$) is decreased by setting a value of less than 1 to the gain Kb when the absolute value of the integration is not more than the predetermined threshold value Ith. This makes it possible for the detected angular acceleration to approach the value of zero, as shown at the right side in FIG. 5. It is thereby possible to increase the linear characteristic of the rotation angle output value $\phi$ which is supplied to the microcomputer 37 from the RDC 35 when the travel motor 1 rotates at a constant rotation speed. This makes it possible to increase the detection accuracy of the rotation angle of the travel motor 1.

According to the first embodiment, the ECU 7 as the control device detects the rotation angle of the travel motor 1 with high accuracy even if the resolver 13 outputs the first rotation detection signal Sa and the second rotation detection signal Sb having a waveform distortion. This can control the rotation of the travel motor 1 with high accuracy. It is therefore possible for the ECU 7 as the control device to suppress the undesirable acceleration caused by rotation detection error, and to avoid the passengers and driver of the vehicle from uncomfortable driving.

In the ECU 7, because the gain control part 53 in the RDC 35 does not adjust the total gain (=$Ka \cdot Kb$) obtained by the two multipliers 49 and 50 when does not detect that the travel motor 1 rotates at a constant rotation speed, the rotation angle output value $\phi$ from the RDC 35 has a good response to the acceleration of the travel motor 1 when the microcomputer 37 instructs the travel motor 1 to accelerate. This makes it possible to control the operation of the travel motor 1 with good and quick response.

The gain control part 53 in the RDC 35 quickly sets the value of 1 to the gain Kb in order to return the value of the total gain (=$Ka \cdot Kb$) to its original value when detecting that the travel motor 1 does not rotate at a constant rotation speed. This makes it possible to have a quick response of the rotation angle output value $\phi$ of the RDC 35 to the acceleration of the travel motor 1 because the total gain (=$Ka \cdot Kb$) is quickly returned to the value of the gain Ka when the travel motor 1 is actually accelerated or decelerated. It is possible to avoid any bad control response when the travel motor 1 is accelerated or decelerated from a constant rotation speed.

Because the acceleration of the vehicle generated by the acceleration of the travel motor 1 is generally larger than undesirable acceleration caused by the rotation detection error, the passengers and driver of the vehicle do not feel the occurrence of the above undesirable acceleration.

According to the rotation state detection process shown in FIG. 4, because the rotation state of the travel motor 1 is detected based on the integration value of the output value (=$\epsilon \cdot Ka$) of the multiplier 49, it is possible to keep the good detection even if the error deviation $\epsilon$ is relatively fluctuated every time period by calculating the error deviation $\epsilon$ by the distortion of the output waveform of the resolver 13.

By the way, the gain control part 53 to perform the process to detect the rotation state of the travel motor 1 shown in FIG. 4 corresponds to the judgment means, and the gain control part 53 to perform the process to control the gain shown in FIG. 3 corresponds to the gain adjustment means. That is, the gain control part 53 in the RDC 35 corresponds to the judgment means and the gain adjustment means.

On the other hand, because the output of the multiplier 49 is the value obtained by multiplying the error deviation $\epsilon$ by the fixed gain Ka, the rotation state detection process shown in FIG. 4 is equal to the process to detect the integration of the error deviation $\epsilon$. It is therefore possible to integrate the error deviation $\epsilon$ in the step S210 shown in FIG. 4.

It is also possible to use the error deviation $\epsilon$ instead of the value "$\epsilon \cdot Ka$" in order to detect whether or not the travel motor 1 rotates at a constant rotation speed. It is also acceptable for the following embodiments to use this.

In the process to detect the rotation state of the travel motor 1 shown in FIG. 4, it is acceptable to respectively calculate the integration of a positive value "$\epsilon \cdot Ka$" indicating a positive acceleration of the travel motor 1 and the integration of a negative value "$\epsilon \cdot Ka$" indicating a negative acceleration of the travel motor 1. The step S230 shown in FIG. 4 calculates a difference between the absolute values of the above integrations, and uses the obtained difference as the integration of the value "$\epsilon \cdot Ka$" per period Ts. Further, it is acceptable to judge whether or not the absolute value of the difference is not more than the predetermined threshold value Ith.

The positive/negative of the calculation does not always indicate a positive sign or a negative sign. That is, when the calculation does not use a value with a sign, the calculation is often performed based on a predetermined reference value of zero. In this case, the positive value is more than the predetermined reference value, and the negative value is less than the predetermined reference value.

Second Embodiment

A description will be given of the control device according to the second embodiment of the present invention with reference to FIG. 6.

Figure 6:
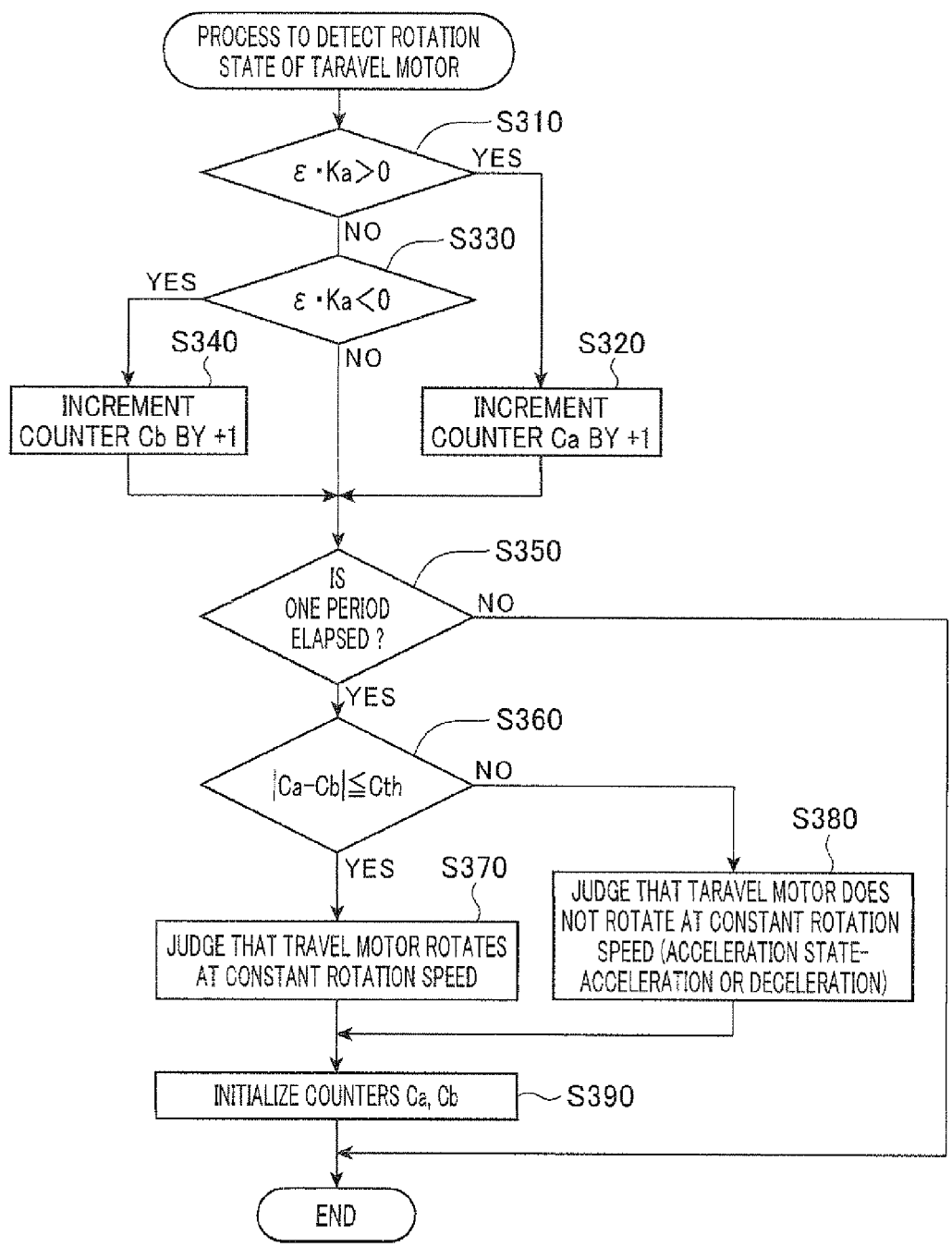
FIG. 6 is a flow chart showing a process to detect the rotation state of the travel motor performed by the gain control part in the RDC of the ECU according to the second embodiment of the present invention.

FIG. 6 is a flow chart showing the process to detect the rotation state of the travel motor 1 performed by the gain control part 53 in the RDC 35 of the ECU 7 according to a second embodiment of the present invention.

When compared with the process to detect the rotation state of the travel motor 1 performed by the gain control part 53 in the RDC 35 of the ECU 7 according to the first embodiment, the gain control part 53 according to the second embodiment performs the process to detect the rotation state of the travel motor 1 shown in FIG. 6 every updating the output of the multiplier 49.

As shown in FIG. 6, the gain control part 53 increments a counter Ca by 1 (step S320) when the multiplier 49 outputs a positive output value (=$\epsilon \cdot Ka$) ("YES" in step S310). On the other hand, the gain control part 53 increments a counter Cb by 1 (step S340) when the multiplier 49 outputs a negative output value (=$\epsilon \cdot Ka$) ("YES" in step S330). The gain control part 53 does not increment the counter Ca and the counter Cb when the output value (=$\epsilon \cdot Ka$) is zero ("NO" in step S310 and step S330).

Like the step S220 shown in FIG. 4, the gain control part 53 further detects whether or not the time of not less than N times one period Ts (N multiplied by one rotation period of the electrical angle $\theta$) of the sin $\theta$ component in the first rotation detection signal Sa has been elapsed (step S350). Like the first embodiment, the second embodiment uses the value N of 1 (N=1) and detects whether or not one period Ts has been elapsed. It is also acceptable for the value N to have an integer of not less than 2.

When the detection result in step S350 indicates that one period Ts has not been elapsed ("NO" in step S350), the RDC 35 in the ECU 7 completes the rotation state detection process. After one period Ts has been elapsed ("YES" in step S350), the gain control part 53 in the RDC 35 calculates a difference between the counter Ca and the counter Cb at this time, and detects whether or not the absolute value of the difference is not less than the predetermined threshold value Cth (step S360).

When the detection result indicates that the absolute value of the difference is not more than the predetermined threshold value Cth ("YES" in step S360), the gain control part 53 judges that the travel motor 1 rotates at a constant rotation speed (step S370). The gain control part 53 initializes the counters Ca and Cb, that is, sets the value of zero to both the counters Ca and Cb (step S390). The RDC 35 completes the process to detect the rotation state of the travel motor 1.

On the other hand, when the detection result indicates that the absolute value of the difference is more than the predetermined threshold value Cth ("NO" in step S360), the gain control part 53 judges that the travel motor 1 does not rotate at a constant rotation speed (step S380), and the travel motor 1 is accelerated (acceleration or deceleration). The gain control part 53 initializes the counters Ca and Cb, that is, sets the value of zero to both the counters Ca and Cb (step S390). The RDC 35 completes the process to detect the rotation state of the travel motor 1.

That is, the rotation state detection process shown in FIG. 6, the counter Ca counts the number of the states for the output (=$\epsilon \cdot Ka$) of the multiplier 49 to be a positive value (which indicates a positive acceleration) during each period Ts while the electrical angle $\theta$ rotates one time. Further, the counter Cb counts the number of the states for the output (=$\epsilon \cdot Ka$) of the multiplier 49 to be a negative value (which indicates a negative acceleration) during each period Ts while the electrical angle $\theta$ rotates one time. Further, it can be considered that the output (=$\epsilon \cdot Ka$) of the multiplier 49 is fluctuated in positive and negative (or plus and minus directions) around zero when the absolute value of the difference between the count values in the counter Ca and the counter Cb per one period Ts is not more than the predetermined threshold value. The RDC 35 judges that the travel motor 1 rotates at a constant rotation speed.

When compared with the process to detect the rotation state of the travel motor 1 shown in FIG. 4, the process to detect the rotation state of the travel motor 1 performed by the RDC 35 shown in FIG. 6 detects the rotation state of the travel motor 1 with a relatively low accuracy, but with a simple detection method.

Third Embodiment

Figure 7:
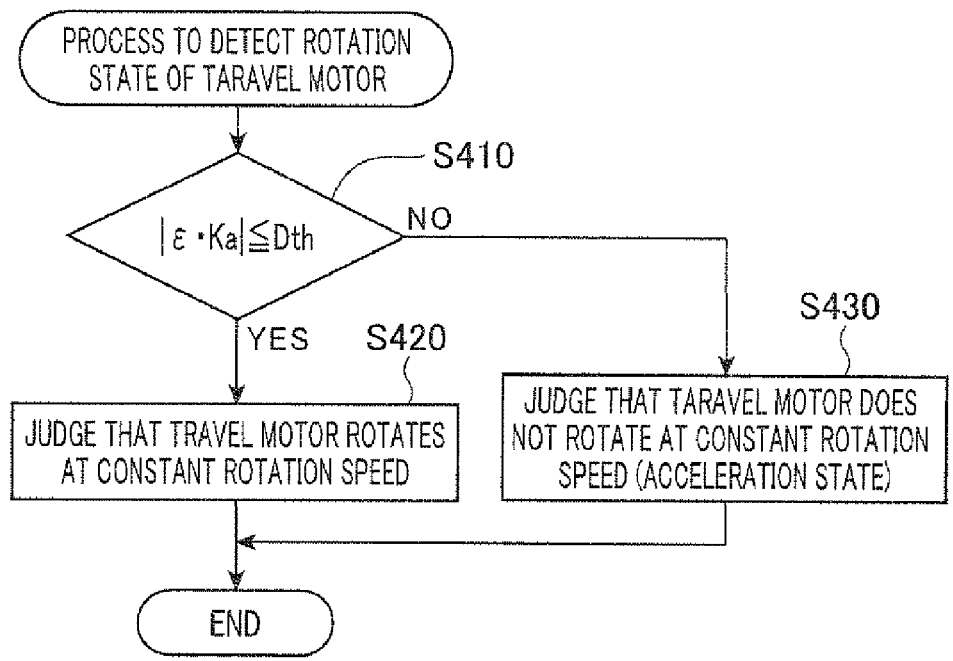
FIG. 7 is a flow chart showing a process to detect the rotation state of the travel motor performed by the gain control part in the RDC of the ECU according to the third embodiment of the present invention.

A description will be given of the ECU 7 as the control device according to the third embodiment of the present invention with reference to FIG. 7. FIG. 7 is a flow chart showing the process to detect the rotation state of the travel motor 1 performed by the gain control part 53 in the RDC 35 of the ECU 7 as the control device according to the third embodiment of the present invention. When compared with the configuration of the ECU 7 according to the first embodiment, the gain control part 53 in the RDC 35 in the ECU 7 according to the third embodiment performs the process to detect the rotation state of the travel motor 1 shown in FIG. 7 instead of the process to detect the rotation state of the travel motor 1 shown in FIG. 4 every updating the output of the multiplier 49.

As shown in FIG. 7, the gain control part 53 in the RDC 35 detects whether or not the absolute value of the output (=ε·Ka) of the multiplier 49 is not more than a predetermined threshold value Dth (step S410). When detecting that the absolute value of the output (=ε·Ka) of the multiplier 49 is not more than the predetermined threshold value Dth ("YES" in step S410), the gain control part 53 judges that the travel motor 1 rotates at a constant rotation speed (step S420).

On the other hand, when detecting that the absolute value of the output (=ε·Ka) of the multiplier 49 is more than the predetermined threshold value Dth ("NO" in step S410), the gain control part 53 judges that the travel motor 1 does not rotate at a constant rotation speed, and is accelerated or decelerated (step S430).

When compared with the process to detect the rotation state of the travel motor 1 shown in FIG. 4, the rotation state detection process performed by the RDC 35 shown in FIG. 7 detects the rotation state of the travel motor 1 with relatively low accuracy, but with a very simple detection method.

Fourth Embodiment

A description will be given of the control device according to the fourth embodiment of the present invention with reference to FIG. 8.

The ECU 7 as the control device according to the fourth embodiment of the present invention has the following additional functions in addition to the function of the ECU 7 in each of the first to third embodiments, previously described.

That is, the gain control part 53 in the RDC 35 in the ECU 7 as the control device according to the fourth embodiment sets a value which is determined based on the rotation speed of the travel motor 1 to the gain value Kb (see FIG. 8) when a value of less than 1 is set to the gain Kb in step S120 shown in FIG. 3. Specifically, the more the rotation speed of the travel motor 1 is decreased, the more the gain Kb is set with a small value in order to decrease the total gain (=Ka·Kb).

Figure 8:
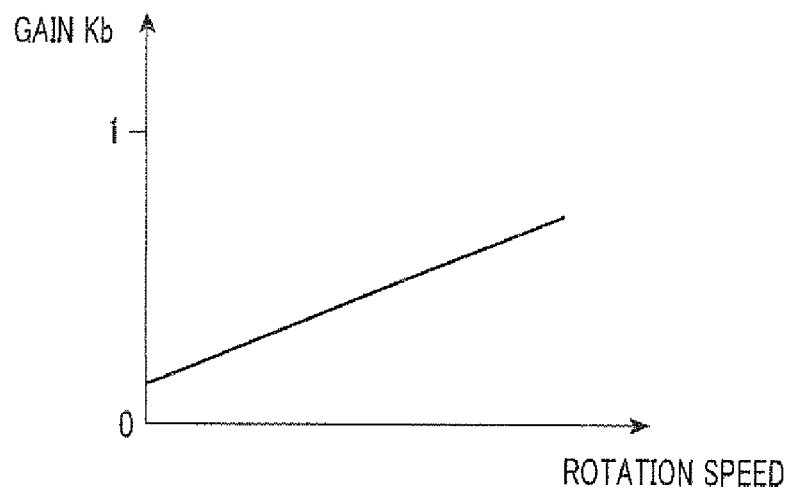
FIG. 8 is a view showing the effect of the ECU as the control device according to the fourth embodiment of the present invention.
Figure 9:
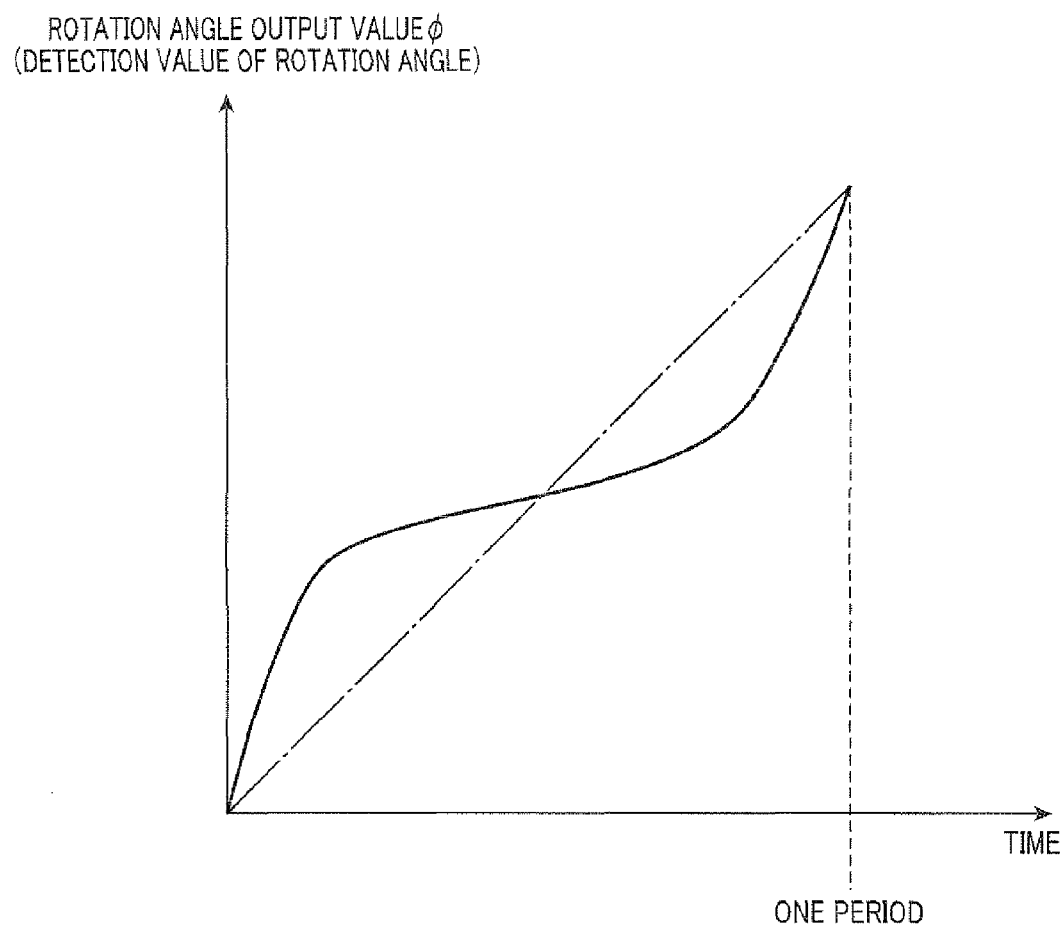
FIG. 9 is an explanatory view showing a conventional problem when the resolver outputs a detection signal with a waveform distortion.
Figure 10:
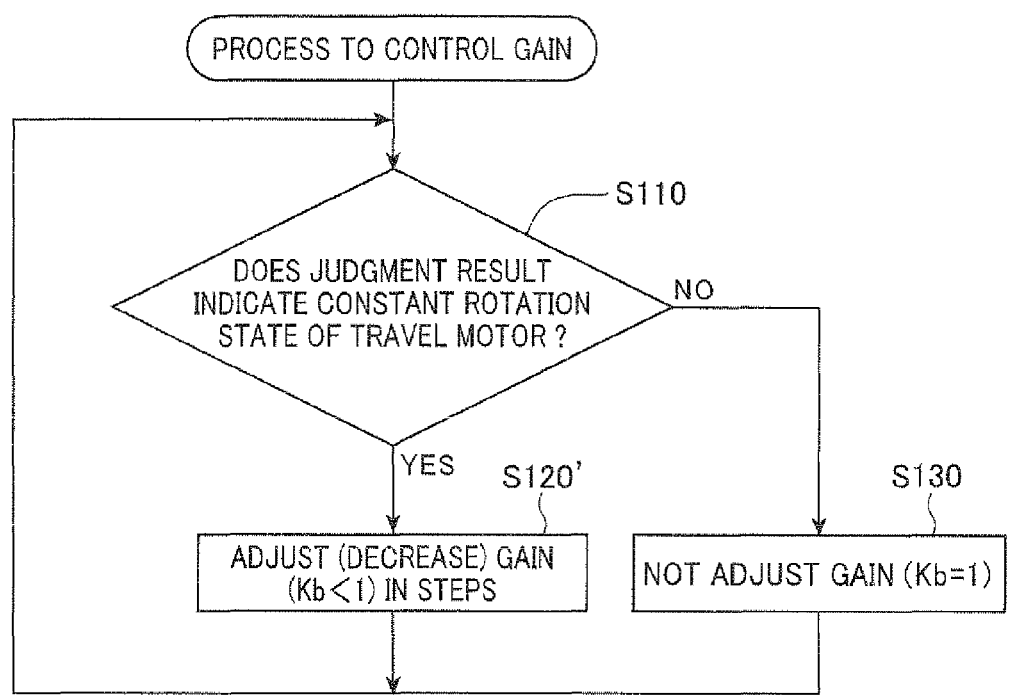
FIG. 10 is a flow chart showing a process to control the gain performed by the gain control part in the RDC of the ECU according to another embodiment of the present invention.

FIG. 8 shows the above process as the effect of the ECU 7 as the control device according to the fourth embodiment of the present invention.

It is sufficient for the gain control part 53 to get the rotation speed of the travel motor 1 through the microcomputer 37, or to calculate the rotation speed of the travel motor 1 based on a change value of the rotation angle output value φ per unit time.

The ECU 7 as the control device according to the fourth embodiment makes it possible to increase the accuracy to control the operation of the travel motor 1 while further suppressing the error of the rotation angle output value φ which is caused by the output waveform distortion of the resolver 13 when the travel motor 1 rotates at a low rotation speed.

Other Embodiments

In the ECU 7 as each of the control devices according to the first to fourth embodiments, when the gain control part 53 in the RDC 35 gradually sets a different value to the gain Kb on setting a value of less than 1 to the gain Kb in step S120 shown in FIG. 3, it is possible to decrease the time period for the tracking loop in the RDC35 to be stable, and to improve the tracking function of the rotation angle output value φ to the electrical angle 9 (the accuracy to detect the rotation angle of the travel motor 1).

Specifically, it is possible to form the gain control part 53 in the RDC 35 which gradually decreases the gain Kb by a predetermined value every constant time during the period when the travel motor 1 rotates at a constant rotation speed.

Further, it is possible to form the gain control part 53 in the RDC 35 which gradually decreases the gain Kb by a predetermined value every time period Ts for the electrical angle 9 to rotates one time, or every period of several integer times of the period Ts.

Still further, it is possible to form the gain control part 53 in the RDC 35 which gradually decreases the gain Kb by a predetermined value every period (as the constant time period, previously described) to calculate the tracking loop during the operation period of the RDC 35

On the other hand, in each of the first to fourth embodiments, previously described, it is possible for the RDC 35 to have an operation switching means to switch the operation mode. This operation switching means in the RDC 35 stops the function of the gain control part 53 and fixes the gain Kb of the multiplier 50 to the value of 1 or directly transfers the output of the multiplier 49 to the integrator 51 when receiving a mode switching signal, transferred from an external device, which instructs that it is not necessary to adjust the gain value.

The RDC 35 having the above configuration and function can be applied to an ECU, which is capable of adequately control the rotation state of a motor without any gain adjusting function. Thus, the RDC 35 in the ECU 7 according to the present invention can be widely applied to various types of ECU. It is also possible for an external device to generate and transfer the mode switching signal to the RDC 35, or for the microcomputer 37 to generate and transfer the mode switching signal to the RDC 35 through a signal line.

As previously described, the control device equipped with the RDC 35 according to the present invention can be applied to various modifications within the scope of the present invention.

For example, the travel motor 1 as the control target is a motor mounted to hybrid vehicles or electric vehicles.

In the first to fourth embodiments, previously described, the RDC 35 detects the output of the subtracter 46. The present invention is not limited by the structure. For example, it is acceptable for the RDC 35 to have the function as follows:

(c-1) the first detector detects the multiplication signal S1 transferred from the multiplier 44, and the exciting signal component f(t) is eliminated from the multiplication signal S1;

(c-2) the second detector detects the multiplication signal S2 transferred from the multiplier 45, and the exciting signal component f(t) is eliminated from the multiplication signal S2; and (c-3) the subtracter 46 inputs the output signals transferred from both of the detectors, and the A/D converter 48 inputs the output signal of the subtracter 46.

(Other Features and Effects of the Present Invention)

In the control device as another aspect of the present invention, the gain adjustment means sets the predetermined value to the gain when the judgment result of the judgment means indicates that the travel motor does not rotate at a constant rotation speed. Thus, the gain is reset to its original value when the travel motor does not rotate at a constant rotation speed.

According to the configuration of the control device according to the present invention, the gain control means instantly sets the original predetermined value to the gain (that is, stops the adjustment process to adjust the gain value) when the judgment means detects that the travel motor does not rotate at a constant rotation speed after the rotation speed of the travel motor is actually increased (or decreased) when the RDC detects that the control state to drive the travel motor at a constant rotation speed is switched to the control state to accelerate the rotation speed of the travel motor. This makes it possible for the rotation angle output value φ supplied from the RDC to be changed with good response to the acceleration of the travel motor. This makes it possible to prevent the control response from decreasing when the travel motor is accelerated from the state of a constant rotation speed.

In the control device as another aspect of the present invention, the judgment means judges that the travel motor rotates at a constant rotation speed when the absolute value of integration of the error deviation ε is a predetermined threshold value. This integration of the error deviation ε is obtained during a time period which is N times of the period of the sin θ component in the first rotation detection signal, and N is an integer of not less than 1. The period of the "sin θ" component in the first rotation detection signal is equal to the period per electrical angle θ (360°), and also equal to the period of the "cos θ" component in the second rotation detection signal.

That is, the error deviation ε ideally has the value of zero when the travel motor rotates at a constant rotation speed. However, in a concrete example, because the resolver outputs the detection signal having a waveform distortion, the error deviation θ is fluctuated around zero even if the travel motor rotates at a constant rotation speed. The error of the error deviation ε would causes an error of the rotation angle output value φ.

Accordingly, it is impossible for the judgment means to judge whether or not the travel motor rotates at a constant rotation speed based on having the error deviation ε of zero. If such a judgment control is performed, this changes the value of the gain, and the gain and the error deviation ε of zero would be multiplied. This process becomes meaningless because the multiplication result becomes zero.

In order to avoid this problem, the judgment means in the RDC of the control device according to the present invention judges that the travel motor rotates at a constant rotation speed only when the absolute value of the integration of the error deviation ε is not more than a predetermined threshold value during the above period because this means that the error deviation ε having some error is changed around the value of zero.

The configuration of the control device according to the present invention makes it possible to judge with high accuracy whether or not the travel motor 1 rotates at a constant rotation speed based on the error deviation ε with some error. In particular, it is possible to keep the judgment accuracy with a high level even if the error deviation ε is relatively fluctuated by the error of the output waveform of the resolver every period to calculate the error deviation ε.

In the control device as another aspect of the present invention, the judgment means counts a first number which is the number of cases when the error deviation ε takes a positive value and a second number which is the number of cases when the error deviation ε takes a negative value during a time period which is N times of a period of the sin θ component in the first rotation detection signal, where N is an integer of not less than 1. The judgment means judges that the travel motor rotates at a constant rotation speed when an absolute value of a difference between the first value and the second value is not more than a predetermined threshold value.

That is, when the absolute of the difference between the first number and the second number is not more than the predetermined threshold value, it can be considered that the travel motor rotates at a constant rotation speed because the error deviation ε is uniformly fluctuated around zero.

This configuration of the control device according to the present invention has an advantage to perform a simple process although this has a relatively low accuracy to judge the rotation state of the travel motor.

In the control device as another aspect of the present invention, the judgment means detects an absolute value of the calculated error deviation ε transferred from the RDC every calculation of the error deviation is a predetermined threshold value. The judgment means further judges that the travel motor rotates at a constant rotation speed when the absolute value of the error deviation ε is not more than the predetermined threshold value.

The configuration of the control device according to the present invention allows the judgment means to perform the simple process to judge the rotation state of the travel motor. Further, because the judgment means performs the judgment every calculation of the error deviation ε, it is possible to have an advantage to instantly decrease the gain with high accuracy when the travel motor is switched from an accelerating state to a constant rotation state.

In the control device as another aspect of the present invention, the gain adjustment means decreases the gain according to the rotation speed of the travel motor so that the gain is decreased according to decreasing the rotation speed of the travel motor.

The configuration of the control device according to the present invention increases the accuracy to control the operation of the travel motor while more suppressing the error of the rotation angle output value φ caused by the distortion of the output waveform of the resolver.

Because the RDC calculates the error deviation ε every constant time period, and obtains the rotation angle output value φ by integrating two times the value (=error deviation ε×gain) which is obtained by multiplying the error deviation ε by the gain, the rotation angle output value φ per one rotation of the electrical angle θ approaches the value which is obtained by integrating the value "error deviation ε×gain" when the rotation speed of the travel motor becomes small, and the time period to perform one rotation of the electrical angle θ becomes more long. In this case, when the error deviation ε has an error caused by the distortion of the output waveform of the resolver, the value obtained by multiplying the error of the error deviation ε with the gain is more accumulated. In order to avoid this drawback, the control device according to the present invention decreases the gain even when the more the rotation speed of the travel motor is low.

In the control device as another aspect of the present invention, the gain adjustment means decreases the gain in steps.

The configuration of the control device according to the present invention decreases the time period requiring for the tracking loop in the RDC to become stable, where the tracking loop is a calculation loop for the rotation angle output value φ to follow the electrical angle θ.

In order to decrease the gain in steps, it is necessary to decrease the gain every time period. For example, this time period is a constant time period or the time period obtained by multiplying N times of the period in the son θ component in the first rotation detection signal (N is an integer of not less than 1), or the time period of the operation of the RDC.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A control device for a travel motor mounted to a vehicle which is equipped with a travel motor and a resolver, where the travel motor drives the vehicle, and the resolver works as a rotation angle sensor to detect a rotation angle of the travel motor, generate and output rotation detection signals, which correspond to a rotation angle of the travel motor, such as a first rotation detection signal and a second rotation detection signal, the first rotation detection signal has a waveform obtained by amplitude modulation of an exciting signal by $\sin\theta$ which is an angle obtained by multiplying the rotation angle of the travel motor by an integer of "n" times of not less than 1, and the second rotation detection signal has a waveform obtained by amplitude modulation of an exciting signal by $\cos\theta$, the control device capable of controlling a supply of an electric power to the travel motor based on a rotation angle output value $\phi$, comprising:

a resolver digital converter (RDC) of a tracking type for receiving a first rotation detection signal and a second rotation detection signal supplied from a resolver, and calculating a value of $\sin(\theta-\phi)$ as an error deviation $\epsilon$ based on the first rotation detection signal, the second rotation detection signal, and a current rotation angle output value $\phi$ every constant time period, and integrating a value which is obtained by multiplying the error deviation $\epsilon$ by a gain as a predetermined value in order to calculate and output a next rotation angle output value $\phi$;

judgment means that judges whether or not the travel motor rotates at a constant rotation speed based on the error deviation $\epsilon$ transferred from the RDC; and gain adjustment means that decreases the gain when the judgment result of the judgment means indicates that the travel motor rotates at a constant rotation speed.

2. The control device according to claim 1, wherein the gain adjustment means resets the gain to the predetermined value when the judgment result of the judgment means indicates that the travel motor does not rotate at a constant rotation speed.

3. The control device according to claim 1, wherein the judgment means judges that the travel motor rotates at a constant rotation speed when an absolute value of integration of the error deviation $\epsilon$ is a predetermined threshold value, where the integration of the error deviation $\epsilon$ is obtained during a time period which is N times of the period of the $\sin\theta$ component in the first rotation detection signal, and N is an integer of not less than 1.

4. The control device according to claim 1, wherein the judgment means counts a first number which is the number of occurrences when the error deviation becomes a positive value, and counts a second number which is the number of occurrences when the error deviation $\epsilon$ becomes a negative value during a time period which is N times of a period of the $\sin\theta$ component in the first rotation detection signal, where N is an integer of not less than 1, and the judgment means judges that the travel motor rotates at a constant rotation speed when an absolute value of a difference between the first number and the second number is not more than a predetermined threshold value.

5. The control device according to claim 1, wherein the judgment means detects whether an absolute value of the calculated error deviation $\epsilon$ transferred from the RDC is not more than a predetermined threshold value every calculation of the error deviation $\epsilon$ by the RDC, and judges that the travel motor rotates at a constant rotation speed when the absolute value of the calculated error deviation $\epsilon$ is not more than the predetermined threshold value.

6. The control device according to claim 1, wherein the gain adjustment means decreases the gain according to the rotation speed of the travel motor so that a magnitude of the decreased gain corresponds to a magnitude of the decreased rotation speed of the travel motor.

7. The control device according to claim 1, wherein the gain adjustment means decreases the gain in steps.

8. The control device according to claim 2, wherein the judgment means judges that the travel motor rotates at a constant rotation speed when an absolute value of integration of the error deviation $\epsilon$ is a predetermined threshold value, where the integration of the error deviation $\epsilon$ is obtained during a time period which is N times of the period of the $\sin\theta$ component in the first rotation detection signal, and N is an integer of not less than 1.

9. The control device according to claim 2, wherein the judgment means counts a first number which is the number of occurrences when the error deviation $\epsilon$ becomes a positive value, and counts a second number which is the number of occurrences when the error deviation $\epsilon$ becomes a negative value during a time period which is N times of a period of the $\sin\theta$ component in the first rotation detection signal, where N is an integer of not less than 1, and the judgment means judges that the travel motor rotates at a constant rotation speed when an absolute value of a difference between the first number and the second number is not more than a predetermined threshold value.

10. The control device according to claim 2, wherein the judgment means detects whether an absolute value of the calculated error deviation $\epsilon$ transferred from the RDC is not more than a predetermined threshold value every calculation of the error deviation $\epsilon$ by the RDC, and judges that the travel motor rotates at a constant rotation speed when the absolute value of the calculated error deviation $\epsilon$ is not more than the predetermined threshold value.

11. The control device according to claim 2, wherein the gain adjustment means decreases the gain according to the rotation speed of the travel motor so that a magnitude of the decreased gain corresponds to a magnitude of the decreased rotation speed of the travel motor.

12. The control device according to claim 2, wherein the gain adjustment means decreases the gain in steps.

* * * * *